United States Patent
Huang

(10) Patent No.: US 7,949,244 B2
(45) Date of Patent: May 24, 2011

(54) METHOD FOR MEASURING SUBJECT DISTANCE

(75) Inventor: Cheng-Wei Huang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 313 days.

(21) Appl. No.: 12/033,219

(22) Filed: Feb. 19, 2008

(65) Prior Publication Data
US 2009/0123142 A1 May 14, 2009

(30) Foreign Application Priority Data
Nov. 9, 2007 (CN) .......................... 2007 1 0202451

(51) Int. Cl.
*G03B 3/00* (2006.01)
(52) U.S. Cl. .......................................... 396/89; 396/106
(58) Field of Classification Search .................... 396/89, 396/106; 356/5.1, 5.11–5.15, 7, 12, 21, 335, 356/622, 625, 628, 4.03, 4.08; 382/142
See application file for complete search history.

(56) References Cited

U.S. PATENT DOCUMENTS

| | | | | |
|---|---|---|---|---|
| 2,524,807 A * | 10/1950 | Kallmann | | 356/4.05 |
| 4,065,778 A * | 12/1977 | Harvey | | 396/101 |
| 4,382,665 A * | 5/1983 | Eguchi et al. | | 348/353 |
| 4,460,259 A * | 7/1984 | Greivenkamp et al. | | 396/75 |
| 4,771,308 A * | 9/1988 | Tejima et al. | | 396/106 |
| 5,673,111 A * | 9/1997 | Nyquist | | 356/622 |
| 5,748,295 A * | 5/1998 | Farmer | | 356/5.09 |
| 6,407,817 B1 * | 6/2002 | Norita et al. | | 356/608 |
| 6,411,371 B1 * | 6/2002 | Hinderling et al. | | 356/4.01 |
| 6,442,345 B1 * | 8/2002 | Kindaichi | | 396/106 |
| 6,507,707 B2 * | 1/2003 | Nonaka | | 396/108 |
| 6,625,397 B2 * | 9/2003 | Nagata | | 396/106 |
| 6,718,134 B2 * | 4/2004 | Murata et al. | | 396/106 |
| 6,826,362 B2 * | 11/2004 | Matsuo | | 396/104 |
| 2003/0164890 A1 * | 9/2003 | Ejima et al. | | 348/333.1 |
| 2005/0207619 A1 * | 9/2005 | Lohmann | | 382/103 |
| 2006/0018650 A1 * | 1/2006 | Ichimiya | | 396/104 |
| 2006/0066723 A1 * | 3/2006 | Iwase et al. | | 348/169 |
| 2007/0122137 A1 * | 5/2007 | Ohnishi | | 396/123 |
| 2008/0150889 A1 * | 6/2008 | Stern et al. | | 345/156 |
| 2009/0027522 A1 * | 1/2009 | May | | 348/252 |

* cited by examiner

*Primary Examiner* — W. B. Perkey
*Assistant Examiner* — Warren K Fenwick
(74) *Attorney, Agent, or Firm* — Jeffrey T. Knapp

(57) ABSTRACT

An exemplary method for measuring a distance from a subject to a camera includes the following operations: focusing on the subject using the imaging system; illuminating an area on the subject using auxiliary light; capturing an image of the subject, the image having an illumination portion corresponding to the illuminated area; measuring the area of the illumination portion of the image; and calculating the subject distance based on the measured area.

7 Claims, 2 Drawing Sheets

METHOD FOR MEASURING SUBJECT DISTANCE

BACKGROUND

1. Technical Field

The invention relates to a method for measuring a distance from a subject to an imaging system (subject distance).

2. Description of Related Art

In order to obtain a distance from a subject to an imaging system such as digital still camera, two ways have been proposed. One of them employs an additional distance sensor for distance measurement. In this way, the subject distance can be accurately measured but cost rises. The other way measures the subject distance using auto focus (AF) data via complicated data processing/calculating of a digital signal processor (DSP) of the imaging system. This increases the burden on the DSP.

Therefore, it is desirable to provide a method for measuring a subject distance, which can overcome the abovementioned problems.

SUMMARY

In a present embodiment, a method for measuring a distance from a subject to a camera is disclosed. The method includes the following operations: focusing on the subject using the imaging system; illuminating an area on the subject using auxiliary light; capturing an image of the subject, the image having an illumination portion corresponding to the illuminated area; measuring the area of the illumination portion of the image; and calculating the subject distance based on the measured area.

DETAILED DESCRIPTION OF THE EMBODIMENTS

Embodiments of the present method will now be described in detail with reference to the drawings.

Figure 1:
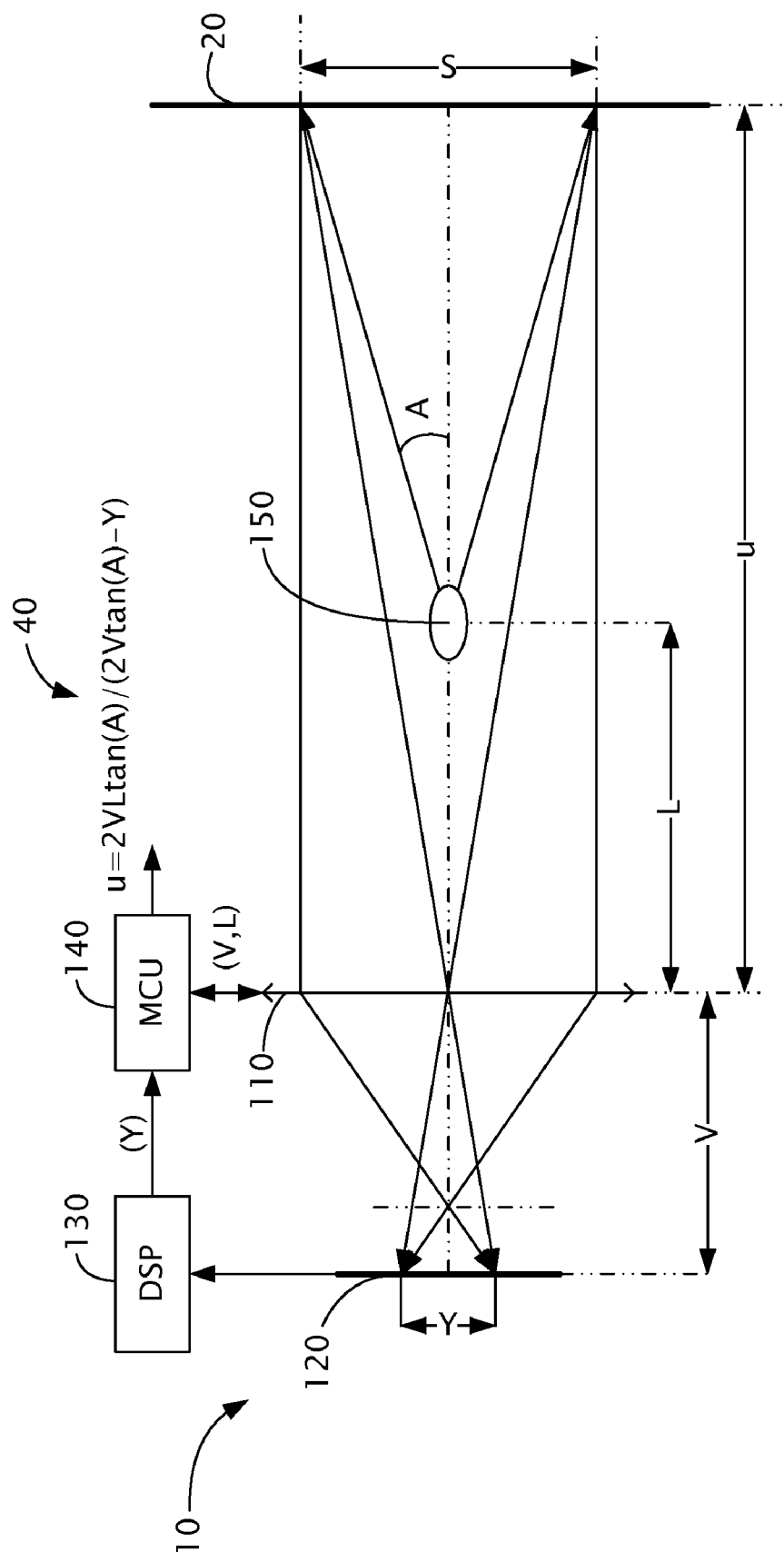
FIG. 1 is a schematic view showing a principle of a method for measuring a subject distance, according to an exemplary embodiment.

Referring to FIG.1, an imaging system 10 configured to perform the present method, according to an exemplary embodiment, can be a digital still camera (DSC), a video camera, or other AF modules, which typically includes an AF lens 110, an image sensor 120, a DSP 130, a micro-control unit (MCU) 140, and an auxiliary light 150. The AF lens 110 is configured to focus on a subject 20 whose distance from the AF lens 110 is to be measured (in this embodiment, the subject distance is defined as the distance from the AF lens 110 to the subject 20 (designated by 'u'), but, understandably, it could conform to other transformable terms, e.g., flash-to-subject distance or camera-to-subject distance). The image sensor 120 such as a charge coupled device (CCD) or complementary metal oxide semiconductor (CMOS) is configured to capture images of the subject 20. The DSP 130 is configured to process the captured images to obtain image data including AF data. The MCU 140 is configured to control the imaging system 10 to perform various functions including AF (based on the AF data). The auxiliary light 150 is configured to help the imaging system 10 to perform AF function in low light (e.g., the auxiliary light 150 illuminates the subject at night so that the captured images are bright enough to be extracted for the AF data).

Figure 2:
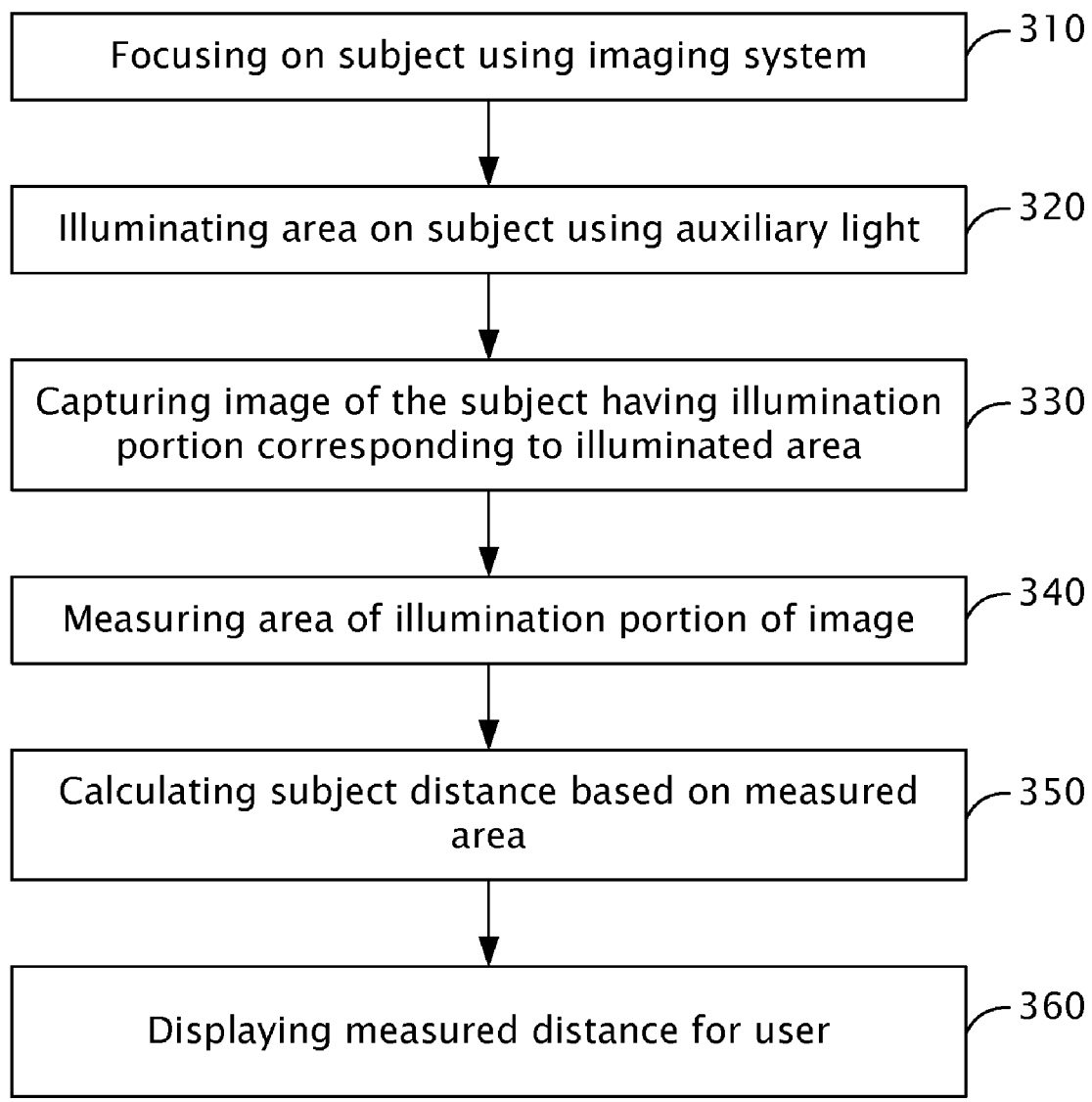
FIG. 2 is a flow chart of the method of FIG. 1.

Also referring to FIG. 2, a method, assumed but not limited to be performed by the imaging system 10, for measuring the subject distance u includes the following operations 310~360.

Operation 310: focusing of the subject 20 onto the image sensor 120. This is carried out by the MCU 140, and various techniques such as phase detection or contrast measurement can be used in this operation.

Operation 320: directing all light beams from the auxiliary light 150 to the subject 20 so as to form an illumination area S (S also represents the diameter of the illumination area) on the subject 20. In detail, after the AF lens 110 is focused, the auxiliary light 150 is powered on (this can be manually controlled, or by the MCU 140), and emits a cone of light (the light beams are cone shaped) of half cone angle A. Next, the whole cone of light is directed to the subject to form the illumination area S.

Operation 330: capturing an image of the subject having an illumination portion Y (Y also represents the diameter of the illumination portion) corresponding to the illumination area S. This is carried out by the image sensor 120.

Operation 340: measuring the area of the illumination portion Y. This is carried out by the DSP 130. Understandably, the auxiliary light 150 is typically a red or green light emitting diode, and, accordingly, the illumination portion Y is a uniform red/green portion, and thereby simplifying measurement of the area of the illumination area Y. Many techniques such as image segmentation (configured to detect the location of the illumination portion in the captured image) can be used for this operation.

Operation 350: calculating the subject distance u based on the measured area. This is carried out by the MCU 140 using a formula 40 shown of FIG. 1, or variations thereof. As for the formula 40, the variables V, L are originally known by the MCU 140 (actually, the variables V, L are generated by the MCU 140, and are configured to bring the captured image into focus); the half cone angle A is fixed, and can be input into the MCU 140 by the manufacturer. Therefore, after the diameter of the illumination portion Y is measured and input to the MCU 120 by the DSP 130, the subject distance u can be calculated.

Operation 360: displaying the measured distance for the user on the screen (not shown) of the imaging system 10.

Apparently, the method is advantageous because measurements are accomplished by simple calculations (only first order functions are involved) and without additional components (imaging systems are commonly equipped with an auxiliary light)

It will be understood that the above particular embodiments and methods are shown and described by way of illustration only. The principles and the features of the present invention may be employed in various and numerous embodiment thereof without departing from the scope of the invention as claimed. The above-described embodiments illustrate the scope of the invention but do not restrict the scope of the invention.

What is claimed is:

1. A method for measuring a distance from a subject to an imaging system, comprising:

focusing on the subject using an auto focus lens of the imaging system;

illuminating an area on the subject using an auxiliary light of the imaging system by emitting a cone of light;

capturing an image of the subject using an image sensor of the imaging system, the image comprising an illumination portion corresponding to the illuminated area;

measuring the area of the illumination portion of the image; and calculating the distance from the subject to the imaging system according to the following formula:

$$u=2VL\tan(A)/(2V\tan(A)-Y);$$

wherein V represents the distance between the auto focus lens and the image sensor, L represents the distance between the auxiliary light and the auto focus lens, A represents a half cone angle of the cone of light, and Y represents the area of the illumination portion.

2. The method as claimed in claim 1, wherein the step of focusing on the subject using the imaging system is performed using a process selected from the group consisting of: a phase detection process and a contrast measurement process.

3. The method as claimed in claim 1, wherein the step of measuring the area of the illumination portion comprises: segmenting the captured image to detect a location of the illumination portion in the captured image.

4. The method as claimed in claim 1, further comprising the step of displaying the measured distance.

5. The method as claimed in claim 1, wherein the imaging system is selected from the group consisting of a digital still camera and a video camera.

6. The method as claimed in claim 1, wherein the imaging system comprises a digital signal processor and a micro-control unit, the digital signal processor being configured to process the captured images to obtain auto-focus data, the micro-control unit being configured to control the imaging system to perform an auto-focus function based on the obtained auto-focus data.

7. The method as claimed in claim 6, wherein the image sensor is selected from the group consisting of a charge coupled device and a complementary metal oxide semiconductor.

\* \* \* \* \*